United States Patent [19]

Plaisted

[11] 4,260,699

[45] * Apr. 7, 1981

[54] POURABLE GROUT INCLUDING FAST ACTING POLYESTER ADHESIVE SYSTEMS AND METHOD OF USE

[75] Inventor: Anthony C. Plaisted, North Royalton, Ohio

[73] Assignee: Celtite, Inc., Cleveland, Ohio

[ * ] Notice: The portion of the term of this patent subsequent to Jan. 23, 1996, has been disclaimed.

[21] Appl. No.: 73,015

[22] Filed: Sep. 6, 1979

[51] Int. Cl.³ .......................... C08L 67/06; C09J 3/16
[52] U.S. Cl. ...................... 525/27; 156/332; 206/219; 206/813; 252/426; 252/428
[58] Field of Search ........................ 525/27; 260/40 R

[56] References Cited

U.S. PATENT DOCUMENTS

| | | | |
|---|---|---|---|
| 3,324,663 | 6/1967 | McLean | 260/40 R X |
| 3,516,955 | 6/1970 | Taft | 525/27 X |
| 3,914,200 | 10/1975 | Oswitch et al. | 525/27 X |
| 4,136,134 | 1/1979 | Plaisted | 525/27 X |

*Primary Examiner*—John C. Bleutge
*Assistant Examiner*—Robert Sellers
*Attorney, Agent, or Firm*—Caesar, Rivise, Bernstein & Cohen, Ltd.

[57] ABSTRACT

A pourable grout including a fast acting polyester adhesive systems and method of use comprising in a polyester resin cartridge a resin and a catalyst, the improvement lying in adding from 1 to 15% by weight of an ethylenically unsaturated monomer, and in replacing the presently used benzoyl peroxide catalyst with a catalyst mixture comprised of benzoyl peroxide and a halogen substituted benzoyl peroxide. The adhesive systems of this invention are utilized in a method of installation of resin bonded rock bolts in mining operations, particularly in cold climates, where speed of installation and reinforcement is essential.

8 Claims, No Drawings

POURABLE GROUT INCLUDING FAST ACTING POLYESTER ADHESIVE SYSTEMS AND METHOD OF USE

This invention relates to pourable grout including fast acting polyester adhesive systems and method of use and in particular relates to a new and improved combination of an ethylenically unsaturated monomer and polyester cartridge catalyst as set forth hereinafter.

There are presently in wide use polyester resin cartridges in the mining and other industries of various purposes including the installation of resin bonded rock bolts where speed of reinforcement is essential. It is known that in cold climates the reaction time between the resin and the catalyst is slowed and in many instances is excessively long.

The presently available cartridges are exemplified by Fourcade et al U.S. Pat. No. 3,731,791 and Rausch U.S. Pat. No. 3,915,297, the disclosures of which are incorporated herein by reference for all purposes.

While the aforesaid cartridges normally work well in most applications, nevertheless in cold climates and with the installation of resin bonded rock bolts the presently required waiting periods are unsatisfactory and must be shortened.

Many of the foregoing problems were solved by the Fast Acting Polyester Adhesive Systems And Method Of Use of U.S. Pat. No. 4,136,134 issued Jan. 23, 1979. However, the aforesaid systems could not be provided in the form of a pourable grout.

It is accordingly an object of the present invention to provide a pourable grout including fast acting polyester adhesive systems and method of use wherein the reaction times are halved or improved even further.

Yet another object of the present invention is to provide a pourable grout including fast action polyester adhesive systems and method of use which have lengthy shelf life, but which are extremely fast acting when called into use.

The foregoing objects as well as other objects of this invention are achieved by providing an improvement wherein there is introduced an ethylenically unsaturated monomer, such as styrene or vinyl toluene and the presently used benzoyl peroxide catalyst is replaced by a catalyst mixture comprised of benzoyl peroxide and a halogen substituted peroxide. This mixture of monomer, catalyst and the unique results obtaining therefrom, is quite surprising to achieve pourability and in view of the fact that the halogen substituted benzoyl peroxides by themselves are not particularly rapid catalysts. With the combination of the presently used unsubstituted benzoyl peroxide and a halogen substituted benzoyl peroxide catalyst, there is an achievement of tremendously rapid gelling, although the unreacted components have substantially long shelf life. This is in contradistinction to the attempt to improve the reaction rate of the resin by incorporation therein of promotors which while effective, greatly shorten the shelf life of the resin.

Another remarkable feature of the present invention is that the reaction rate is substantially not significantly slowed down in the extremely low temperature range.

By virtue of the foregoing invention there is provided a cartridge which has been demonstrated to fulfill the need for a self-setting composition which will secure an anchor bolt in a rock or mine wall at a speed comparable to that required to install a mechanical bolt.

The resins used in the cartridges of this invention consist of solutions of unsaturated polyester resins in ethylenically unsaturated monomers, such as styrene or vinyl toluene, methyl methacrylate, etc. or mixtures of these materials. Suitable inhibitors are also included in the mixture such as tertiary butyl catechol or hydroquinone, together with promotors, such as tertiary amines e.g. dimethyl aniline or dimethyl-p-toluidine. Inorganic fillers may also be incorporated into the resins to the extent of from 30% to 90%, preferable 70% to 80%, e.g. calcium carbonate, silica sand, talc, calcium sulphate, etc.

Catalyst pastes used heretofore, consist of benzoyl peroxide dispersed in a suitable plasticizer, such as dimethyl phthalate together with or without a filler, such as dolomite. The concentration of benzoyl peroxide is preferably in the range of 20% to 30%.

Cartridges are made by extrusion methods as described in U.S. Pat. No. 3,371,791 May, 1973 (Fourcade) with a resin mastic to catalyst paste ration of 15:1. Such compositions to date may have gel times ranging from 30 minutes to down to 30 seconds at 70° F.

The novelty of the invention rests in the combination in paste form of an ethylenically unsaturated monomer with two (2) peroxides, namely (a) benzoyl peroxide and (b) halogen substituted benzoyl peroxide. For example, 2, 4, dichloro benzoyl peroxide at a concentration of from 1% to 15% of the total paste formulation is quite effective. It is contemplated that the halogen substituted benzoyl peroxide will include any operative compound of this general class including mono substituted compounds, such as parachloro benzoyl peroxide or at other positions or di-substituted compounds or of even greater saturation.

Reaction of this foregoing catalyst blend (without the monomer) with a highly promoted ortho phthalic polyester resin results in significantly faster gel times which in some cases are over ten (10) times the original reaction rate. Such highly promoted resins are well known in the art, as described above.

This increased speed of reaction was entirely unexpected since the reaction of paste (2) alone, at a benzoyl peroxide content of 20% to 30% and a ratio of 15:1 results in a gel time of not less than 30 seconds at 70° F. Whereas, the reaction of paste (b) alone, at the same peroxide level and same ratio results in incomplete polymerization with the resin forming no more than a soft gel at 70° F.

From the foregoing it will be appreciated that a minor amount, 2, 4, dichloro benzoyl peroxide when combined with unsubstituted benzoyl peroxide achieves a synergistic result. This effect was completely unexpected since 2, 4, dichloro benzoyl peroxide is normally used by those skilled in the art as a peroxide initiator in elevated temperatures in the polymerization of acrylic syrups and polyester resins, specifically in the continuous hot air vulcanization of silicone elastomers.

The mono-chloro derivative is quite effective in accelerating the reaction rate of the benzoyl peroxide paste in a similar concentration of from 1% to 15% of the total paste formulation.

The following examples serve to illustrate the improved reactivity of the combined pastes without necessarily restricting the scope of their application in the polymerization of unsaturated polyester systems.

The unsaturated polyester resin based systems catalyzed with benzoyl peroxide pastes of the above invention may be formulated within the following limits:

| | Percent by Weight |
|---|---|
| 70% Unsaturated Polyester Resin | 10–70 |
| Inorganic Filler | 30–90 |
| Dimethyl Aniline | 0.1–0.5 |
| Thixotropic Additives | 0–3 |
| Benzoyl Peroxide Paste Blend (23.5% Benzoyl Peroxide) | 5–10 |

The benzoyl peroxide paste blends are prepared by dispersing the organic peroxide and some inorganic fillers in suitable inert plasticizers such as chlorinated paraffins, castor oil, phthalate esters, etc.

Examples of specific formulations of the peroxide catalyst are as follows:

EXAMPLE A

| | Percent by Weight |
|---|---|
| Benzoyl Peroxide (55% in Butyl Benzoyl Phthalate) | 34.5 |
| 2, 4, Dichloro benzoyl Peroxide (50% in Dibutyl Phthalate) | 10.0 |
| Castor Oil | 15.5 |
| Limestone Filler (300 mesh) | 40.0 |
| | 100.0 |

EXAMPLE B

| | Percent by Weight |
|---|---|
| Benzoyl Peroxide (55% in Butyl Benzyl Phthalate) | 34.4 |
| 2, 4, Dichloro Benzoyl Peroxide (50% in Dibutyl Phthalate) | 10.0 |
| Dioctyl Adipate | 55.5 |
| | 100.0 |

EXAMPLE C (a prior art for mulation)

| | Percent by Weight |
|---|---|
| Benzoyl Peroxide (55% in Butyl Benzoyl Phthalate) | 43.4 |
| Castor Oil | 16.6 |
| Limestone Filler (300 mesh) | 40.0 |
| | 100.0 |

TABLE 1

| Highly Promoted Unsaturated Polyester Mastic (Formulated as above) | BPO Paste | Temperature | Gel Time |
|---|---|---|---|
| 100G | 7g Paste A | 68° F. | 12 secs |
| 100g | 7g Paste A | 20° F. | 32 secs |
| 100g | 7g Paste A | −10° F. | 90 secs |
| 100g | 7g Paste C | 68° F. | 36 secs |
| 100g | 7g Paste C | 20° F. | 480 secs |
| 100g | 7g Paste C | −10° F. | No gel formed after 30 Minutes |

TABLE 2

| Moderately Promoted Unsaturated Polyester Mastic (Formulated as above) | BPO Paste | Temperature | Gel Time |
|---|---|---|---|
| 100g | 7g Paste A | 70° F. | 105 secs |
| 100g | 7g Paste A | 60° F. | 220 secs |
| 100g | 7g Paste C | 70° F. | 1500 secs |
| 100g | 7g Paste C | 60° F. | 2400 secs |

With reference to the preferred peroxide paste, this is made up from BPO powder together with a plasticizer system consisting of polypropylene glycol of molecular weight 400–450 and/or castor oil. The advantage of such a blend is twofold. (1) control of viscosity, and (2) very low solubility for benzoyl peroxide. A further preference in the paste formulation is for the use of the dihalogen BPO suspended in silicone oil (viscosity 1000 cups) rather than dibutyl phthalate. There would appear to be marked improvements in the paste consistency as well as being a cheaper product.

A typical formulation is:

| | Percent by Weight |
|---|---|
| Benzoyl Peroxide Powder (35% on Dicalcium Phosphate) | 50.5 |
| 2, 4, Dichloro Benzoyl peroxide (50% is Silicone Oil) | 12.0 |
| Polypropylene Clycol (M.W.400) | 38.0 |
| | 100.0 |

EXAMPLE D

| | |
|---|---|
| Benzoyl Peroxide (55% in Butyl Benzoyl Phthalate) | 34.5 |
| Para Chloro Benzoyl Peroxide (50% in Dibutyl Phthalate) | 10.0 |
| Dioctyl Adipate | 55.5 |
| | 100.0 |

TABLE 3

| Highly Promoted Unsaturated Polyester Mastic (Formulated as above) | BPO Paste | Temperature | Gel Time |
|---|---|---|---|
| 100g | 7g Paste C | 68° F. | 36 secs |
| 100g | 7g Paste C | 30° F. | 150 secs |
| 100g | 7g Paste D | 68° F. | 20 secs |
| 100g | 7g Paste D | 30° F. | 60 secs |

As can be seen from Table 1, a major advantage of this invention is the ability to formulate compositions capable of reacting at far lower temperatures than hitherto found practical. One limiting factor to the production of very fast reacting polyester systems for these applications is the instability of the highly promoted unsaturated polyester resin. This instability imposes a storage life limitations on the product. The new invention allows the use of a less highly promoted polyester system having extended shelf life together with increased speed of reaction. This is particularly important in the application of resin bonded rock bolts in mining operations in cold climates, where speed of reinforcement is essential. In such operations at normal ambient temperatures, it is usual to use resin cartridges having gel time ranging from 30 seconds to two (2) minutes.

Cartridges were made with the above composition using techniques as disclosed in U.S. Pat. No. 3,371,791. Size of cartridges are 22 mm diameter, and 12" long. An overhead hole 25 mm in diameter and four feet (4') long was drilled into a shale/coal matrix and one of the above cartridges was inserted to the back of the hole. A six foot (6') length of ⅞" rebar attached to a drill was then spun into the cartridge at 500 rpm. The rebar bolt was fully home to the back of the hole in 10 seconds and the rotation discontinued. The very rapid reaction allowed the bolt to be fully supported within 20 seconds. After only two (2) minutes, a hydraulic tensioning device was attached to the free end of the bolt and a direct tensile load applied at a rate of one (1) ton every 15 seconds. The resin/rock interface yielded at 12 tons tensile load, which was considered more than adequate for that time interval from bolt insertion.

The above adhesive system can be very readily adapted for use as a pourable grout for anchorages of steel bar and wire strand in sub-zero temperature conditions. To date, such anchorages have been very difficult to achieve, other than by mechanical means.

By suitable adjustment of the formulation, a pourable grout can be made which sets within minutes in the temperature range 0° F. (minus 18° C.) down to minus 40° F.). This allows for speedy installation of deep anchors. Furthermore, the system reacts with unexpected quickness to develop satisfactory working strength within hours of placement.

In order to achieve a pourable consistency at subzero temperatures, the addition of from 1 to 15% by weight of ethylenically unsaturated monomer, such as styrene, vinyl toluene or methyl methacrylate is required. Despite this relatively high monomer content, shrinkage after cure is within acceptable limits, although with amounts above 15% shrinkage tends to become unacceptable.

Examples of specific formulations of the resin mastic are as follows:

EXAMPLE E

|  | Percent by Weight |
| --- | --- |
| Highly promoted unsaturated polyester resin | 40.0 |
| Styrene monomer | 10.0 |
| Miami Filler (medium/fine limestone) | 50.0 |
|  | 100.0 |

EXAMPLE F

|  | Percent by Weight |
| --- | --- |
| Highly promoted unsaturated polyester resin | 53.2 |
| Styrene monomer | 13.3 |
| Piqua limestone number 2 L.S. | 33.5 |
|  | 100.0 |

Viscosities of both the above mastics are in the range 400 to 700 cps. at −20° F. as measured on the Brookfield Viscometer (Model R.V.T. Number 2 spindle at 20 rpm).

In order to make a catalyst paste of useable consistency at temperatures down to −40° F. only certain plasticizers are satisfactory. To obtain an extrudable paste, the preferred plasticizer is dibutyl phthalate. Examples of the specific formulations of the peroxide catalyst are as follows:

EXAMPLE G

|  | Percent by Weight |
| --- | --- |
| Benzoyl Peroxide (55% in Dibutyl Phthalate) | 30.0 |
| 2, 4, Dichloro Benzoyl Peroxide (50% in Dibutyl Phthalate) | 14.0 |
| Dibytyl Phthalate | 56.0 |
|  | 100.0 |

EXAMPLE H

|  | Percent by Weight |
| --- | --- |
| Benzoyl Peroxide Powder (35% in Dicalcium Phosphate) | 50.0 |
| 2, 4, Dichloro Benzoyl Peroxide (50% in Dibutyl Phthalate) | 13.0 |
| Titanium Dioxide Pigment | 7.0 |
| Dibutyl Phthalate | 30.0 |
|  | 100.0 |

The above pastes may be packaged in either plastic tubes or polyethylene sachets for ease of extrusion. Combining the resin mastic with the catalyst pastes as prepared above gave gel times ranging from two (2) minutes to 20 minutes, as shown in TABLE 4.

TABLE 4

| Highly Promoted Unsaturated Polyester Mastic (Formulated as above) | BPO Paste | Temperature | Gel Time |
| --- | --- | --- | --- |
| 100g Mastic E | 7g Paste G | 0° F. | 2 minutes |
| 100g Mastic E | 7g Paste G | −10° F. | 10 minutes |
| 100g Mastic F | 7g Paste H | −20° F. | 15 minutes |
| 100g Mastic F | 7g Paste H | −30° F. | 20 minutes |

Six (6) (4"×2") cylinders were prepared for uniaxial compression testing, together with six (6) (2"×1") cylinders for Brazilian tensile determination. These cylinders were first brought to −15° F. by placing in a refrigerator together with the resin mastic and catalyst paste. After mixing the resin and catalyst all cylinders were filled at −15° F. Within nine (9) minutes the temperature of the grout had risen to 196° F. (91° C.). After fifteen (15) minutes it had dropped back to 188° F. (87° C.).

After successive intervals, two (2) cylinders were removed from the refrigerator and tested for compressive and tensile strength and volume shrinkage.

| RESULTS (using resin F and Catalyst H) | 6 hrs. | 24 hrs. | 7 days | 1 month |
| --- | --- | --- | --- | --- |
| Compressive Strength (p. s. i.) | 4800 | 5700 | 9000 | 12,100 |
| Brazilian Tensile Strength (p. s. i.) | 637 | 850 | 1146 | 1,200 |
| Volume Shrinkage (%) | 1.23 | 1.25 | 1.25 | 1.25 |

An on-site test using resin F and catalyst H was carried out at a temperature of 0° F. when a 1⅜" diameter threaded bar was grouted into a 2¾" hole drilled six (6) feet deep into a granite/quartz rock. The hole was set at an angle of 40° to vertical, in order to test the flowing characteristics of the grout, during placement. After one month dial gauges were installed and a load of 100 Kips (50 tons) was applied. The anchor did not fail and the creep stress was within acceptable limits.

As an illustration of the versatility of the reaction, an alternative and sometimes more convenient method of using the grout is to split the benzoyl peroxide catalyst system, such that the unsubstituted benzoyl peroxide portion in powder form is pre-mixed in the filler, while the halogen substituted portion is carried in the paste.

The benzoyl peroxide/filler powder blend is first added to the polyester adhesive (polyester resin and monomer) just prior to use, which at low ambient temperatures has a very extended pot life, and would not normally cure at sub-zero temperatures. The halogen substituted benzoyl peroxide paste is then added to effect immediate polymerization. The advantages of such a procedure allow for complete control over the operation by minimizing the final mixing period and assuring a successful installation.

Furthermore, this method demonstrates the usefulness of the halogen substituted benzoyl peroxide paste as an accelerator in applications when low ambient temperatures slow up the reactions of the benzoyl peroxide/filler blend. This situation usually occurs at temperatures at and below 32° F.

| EXAMPLES OF ANCHOR GROUT FORMULATION USING SPLIT BENZOYL PEROXIDE CATALYST | |
|---|---|
| | Percent by Weight |
| Highly Promoted Unsaturated | |
| Polyester Resin | 80.0 |
| Styrene | 20.0 |
| | 100.0 |
| Filler/Benzoyl Peroxide Blend | |
| Miami Filler (medium/fine limestone) | 94.0 |
| Benzoyl Peroxide (35% on Dicalcium Phosphate) | 6.0 |
| | 100.0 |
| Halogen substituted Benzoyl Peroxide Paste | |
| 2, 4, Dichloro Benzoyl Peroxide (50% in Dibutyl Phthalate) | 64.0 |
| Titanium Dioxide | 4.0 |
| Dibutyl Phthalate | 32.0 |
| | 100.0 |
| Typical Anchor Grout Formulation | |
| Unsaturated Polyester Resin Component | 49.0 |
| Filler/Benzoyl Peroxide Blend | 49.0 |
| Halogen Substituted Benzoyl Peroxide Paste | 2.0 |
| | 100.0 |

From the foregoing, it can be seen that both two (2) part and three (3) part or component formulations are provided. For instance, in a two (2) part system there can be as a first part, a resin mastic or resin component such as example F and as a second part, a catalyst formulation such as example H. The two (2) part system can be provided in two (2) compartments of a cartridge as in the Rausch U.S. Pat. No. 3,915,297 or without any separating barrier as in U.S. Pat. No. 3,731,791. Thereafter, a pourable grout is prepared by rupturing the cartridge so that the two (2) components can be quickly mixed together. The pourable grout thus prepared, is used for speedy installation of deep anchors. The gel times of Table 4 show the extremely fast gel times in very low temperatures.

A three (3) compartment system can be established using as a first component the unsubstituted benzoyl peroxide/filler blend. The second component is a polyester adhesive composed of polyester resin and a monomer. The third component is the halogen substituted benzoyl peroxide paste. The three (3) components can be provided in a three (3) compartment cartridge.

Alternatively the first component is an unsubstituted benzoyl peroxide paste, the second component is a substituted benzoyl peroxide paste, and the third component is the polyester adhesive with a filler and a monomer as in Example E. These can be presented in a three compartment cartridge.

When working at extremely low temperatures it is possible to mix the first two (2) components of the three (3) component system together and hold the same for a considerable time because the first two (2) components will normally not cure at sub-zero temperatures. The halogen substituted benzoyl peroxide paste is then added to achieve polymerization. The pourable grout thus obtained is then immediately used in view of the extremely fast curing times.

Without further elaboration, the foregoing will so fully illustrate my invention that others may, by applying current or future knowledge, readily adapt the same for use under various conditions of service.

What is claimed as the invention is:

1. A pourable grout including solutions of unsaturated polyester resin in ethylenically unsaturated monomers and a catalyst paste therefor, the improvement being in providing with said polyester resin from 1 to 15% by weight of an ethylenically unsaturated monomer, and further providing as said catalyst paste the combination of an unsubstituted benzoyl peroxide, a halogen substituted benzoyl peroxide and a filler and plasticizer for said polyester, said halogen substituted benzoyl peroxide being selected from the group consisting of 2,4, dichoro benzoyl peroxide, and parachloro benzoyl peroxide, said halogen substituted benzoyl peroxide being present in said paste in an amount by weight of from 1 to 15% and said unsubstituted benzoyl peroxide being present in said paste in an amount greater than said substituted benzoyl peroxide.

2. The grout of claim 1 wherein said halogen substituted benzoyl peroxide is 2,4, dichloro benzoyl peroxide.

3. The grout of claim 1 wherein said peroxide is parachloro benzoyl peroxide.

4. The grout of claim 1 wherein said unsaturated monomer is selected from the group consisting of styrene, vinyl toluene and methyl methacrylate.

5. A method of achieving a bond in a very quick manner which comprises using a pourable grout including solutions of unsaturated polyester resin in ethylenically unsaturated monomers and a catalyst paste therefor, the improvement being in providing with said polyester resin from 1 to 15% by weight of an ethylenically unsaturated monomer, and further providing as said catalyst paste the combination of an unsubstituted benzoyl peroxide, a halogen substituted benzoyl peroxide and a filler and plasticizer for said polyester, said halogen substituted benzoyl peroxide being selected from the group consisting of 2,4 dichloro benzoyl peroxide, and parachloro benzoyl peroxide, said halogen substituted benzoyl peroxide being present in said paste in an amount by weight of from 1 to 15% and said unsubstituted benzoyl peroxide being present in said paste in an amount greater than said substituted benzoyl peroxide, and imposing a mixing action to combine said polyester and said catalyst paste in order to achieve a bond.

6. The method of claim 5 wherein said halogen substituted benzoyl peroxide is 2,4, dichloro benzoyl peroxide.

7. The method of claim 5 wherein said peroxide is parachloro benzoyl peroxide.

8. The method of claim 5 wherein said unsaturated monomer is selected from the group consisting of styrene, vinyl toluene and methyl methacrylate.

* * * * *